United States Patent
Huang et al.

(10) Patent No.: US 11,608,418 B2
(45) Date of Patent: *Mar. 21, 2023

(54) METHOD OF PREPARING SELF-ADHESIVE POLYESTER ELASTOMER COMPOSITE MEMBRANE AND COMPOSITE STRIP

(71) Applicant: Taiwan Textile Federation, R.O.C., Taipei (TW)

(72) Inventors: Shu-Hui Huang, Taipei (TW); Sheng-Jen Lin, Taipei (TW); Yao-Hung Kuo, Taipei (TW); Jian-Fan Chen, Taipei (TW); Yun-Chin Kuo, Taipei (TW); Yu-Chuan Lin, Taipei (TW)

(73) Assignee: TAIWAN TEXTILE FEDERATION, R.O.C., Taipei (TW)

( * ) Notice: Subject to any disclaimer, the term of this patent is extended or adjusted under 35 U.S.C. 154(b) by 295 days.

This patent is subject to a terminal disclaimer.

(21) Appl. No.: 16/885,136

(22) Filed: May 27, 2020

(65) Prior Publication Data

US 2021/0371607 A1 Dec. 2, 2021

(51) Int. Cl.
| | |
|---|---|
| C08J 5/12 | (2006.01) |
| C09J 7/25 | (2018.01) |
| B32B 27/36 | (2006.01) |
| B32B 7/12 | (2006.01) |
| B32B 27/10 | (2006.01) |
| B32B 37/02 | (2006.01) |
| B32B 27/08 | (2006.01) |

(52) U.S. Cl.
CPC .............. *C08J 5/124* (2013.01); *B32B 7/12* (2013.01); *B32B 27/08* (2013.01); *B32B 27/10* (2013.01); *B32B 27/36* (2013.01); *B32B 37/02* (2013.01); *C09J 7/255* (2018.01); *B32B 2405/00* (2013.01); *C08J 2367/00* (2013.01); *C09J 2467/006* (2013.01)

(58) Field of Classification Search
CPC ..... B32B 2405/00; B32B 27/08; B32B 27/10; B32B 27/36; B32B 37/02; B32B 7/12; B32B 2250/02; B32B 2250/244; B32B 2367/00; B32B 27/18; B32B 37/15; B32B 37/153; B32B 7/36; B32B 7/10; B32B 7/08; C08G 63/672; C08G 63/916; C08G 63/91; C08G 63/66; C08G 69/44; C08J 2367/00; C08J 5/124; C08J 3/09; C08J 3/095; C08J 3/11; C08J 5/18; C09J 2467/00; C09J 2467/006; C09J 7/255; C09J 7/38; C09J 2203/358; C09J 7/10; D04H 3/011; D04H 3/16

See application file for complete search history.

(56) References Cited

U.S. PATENT DOCUMENTS

| | | | | |
|---|---|---|---|---|
| 10,967,620 B2 * | 4/2021 | Huang | ............... | B32B 25/14 |
| 11,174,363 B2 * | 11/2021 | Huang | ............... | B05D 5/00 |
| 11,421,088 B2 * | 8/2022 | Huang | ............... | C09J 7/10 |
| 2004/0106732 A1 * | 6/2004 | Tsuji | ............... | C08L 53/00 |
| | | | | 525/94 |
| 2009/0250845 A1 * | 10/2009 | Suzuki | ............... | B29C 45/162 |
| | | | | 264/510 |
| 2013/0186539 A1 * | 7/2013 | Takahashi | ............. | B32B 27/322 |
| | | | | 428/215 |
| 2014/0220274 A1 * | 8/2014 | Oda | ............... | C08L 77/06 |
| | | | | 428/36.6 |
| 2016/0053434 A1 * | 2/2016 | Feng | ............... | B32B 5/00 |
| | | | | 442/364 |
| 2020/0338874 A1 * | 10/2020 | Huang | ............... | C08G 18/3228 |
| 2021/0371607 A1 * | 12/2021 | Huang | ............... | B32B 27/36 |

* cited by examiner

*Primary Examiner* — Frances Tischler
*Assistant Examiner* — Gennadiy Mesh
(74) *Attorney, Agent, or Firm* — Chun-Ming Chih; HDLS IPR Services

(57) ABSTRACT

A method of preparing self-adhesive polyester elastomer composite membrane includes the following steps: mix methyl formate or ethyl acetate with thermoplastic polyester elastomer (TPEE) powder or granules; add a modifier, a photo initiator or a thermal initiator; continue mixing to prepare uniformed mixture; after drying uniformed mixture prepare a polyester elastomer membrane through an injection laminating process and apply pressure sensitive adhesive on one side of the polyester elastomer membrane. Prepared membrane poses good bonding characteristics to textile materials and can be used in production of clothing.

9 Claims, 3 Drawing Sheets

METHOD OF PREPARING SELF-ADHESIVE POLYESTER ELASTOMER COMPOSITE MEMBRANE AND COMPOSITE STRIP

BACKGROUND

Technical Field

The present disclosure relates to a method of preparing polyester elastomer composite membrane and composite strip, and more particularly to a method of preparing self-adhesive polyester elastomer composite membrane and composite strip that combines with a pressure sensitive adhesive.

Description of Related Art

The statements in this section merely provide background information related to the present disclosure and do not necessarily constitute prior art.

In present social environment, due to the rise of environmental protection awareness, more and more attention is paid to product recycling capabilities, and whether secondary environmental pollution will be caused after recycling. Now, most of the strips used for the bonding between textile materials of textiles are made of thermosetting polyurethane (PU) or thermoplastic polyurethane elastomer (TPU), and most of them have di-isocyanate, which are highly toxic and easily cause environmental pollution and human organ damage. Moreover, because the strips are not environmentally friendly materials, when the textiles are melted and recycled, the thermosetting polyurethane or the thermoplastic polyurethane elastomer generates residues due to melting, resulting in a situation in which recovery is not easy.

Although the material of the thermoplastic polyester elastomer (TPEE) and the material of the polyester fiber commonly used in textile products are approximately the same material, their application in polyester fiber material should have better compatibility. However, due to the poor conformability and elastic recovery rate of TPEE material, there is no related application that uses the TPEE as a bonding material of the polyester fiber.

Therefore, how to design a method of preparing self-adhesive polyester elastomer composite membrane and composite strip, which modifies the TPEE film by a compound to improve bonding strength and elastic recovery rate of polyester elastomer membrane, and which combines with a self-adhesive pressure sensitive adhesive, is an important subject studied by the inventor of the present disclosure.

SUMMARY

A first purpose of the present disclosure is to provide a method of preparing self-adhesive polyester elastomer composite membrane, which solves the technical problems of poor bonding strength and elastic recovery rate of prior art materials, and which combines with a self-adhesive pressure sensitive adhesive to achieve the first purpose of improving bonding strength and elastic recovery rate and being convenient to use.

In order to achieve the first purpose, the method of preparing self-adhesive polyester elastomer composite membrane of the present disclosure includes the following steps: Adding a first reaction solvent with 0.5-20 parts by weight to thermoplastic polyester elastomer (TPEE) powder or granules to prepare a solvent mixture, the first reaction solvent being methyl formate or ethyl acetate. Adding a modifier with 0.5-10 parts by weight to the solvent mixture, and mixing uniformly to prepare a first mixture, the modifier including at least one of o-xylylenediamine, m-xylylenediamine, alpha, alpha'-diamino-p-xylene, 2,3,5,6-Tetrachloro-p-xylene-alpha,alpha'-diamine, and 1,3,5,7-Tetraazatricyclodecane. Adding a first initiator with 0.5-20 parts by weight to the first mixture, and mixing uniformly to prepare a second mixture, the first initiator including a photo initiator or a thermal initiator. Drying the second mixture in environment with a temperature between 95° C. and 115° C., and preparing a polyester elastomer membrane through an injection laminating process. Mixing butylacrylate with 10-30 parts by weight, methylacrylate with 10-30 parts by weight, and acrylic acid with 10-30 parts by weight uniformly to prepare a third mixture. Adding a second reaction solvent with 10-30 parts by weight to the third mixture, and mixing uniformly to prepare a fourth mixture, the second reaction solvent being methyl formate or ethyl acetate. Adding diaminodiphenylmethane with 0.5-5 parts by weight, phthalic acid anhydride parts by weight, and powder of triacryloylhexahydro-1,3,5-triazine 0.5-5 parts by weight to the fourth mixture, and mixing uniformly to prepare a fifth mixture. Adding a second initiator with 0.5-5 parts by weight to the fifth mixture, and mixing uniformly to prepare a sixth mixture, the second initiator including a photo initiator or a thermal initiator. Placing the sixth mixture in environment with 100% nitrogen and a temperature between 60° C. and 90° C. for a polymerization reaction in two hours to prepare a pressure sensitive adhesive. Pasting the pressure sensitive adhesive on one side of the polyester elastomer membrane, and placing in environment with a temperature between 60° C. and 90° C. to prepare the self-adhesive polyester elastomer composite membrane.

Further, a weight average molecular weight of the TPEE powder or granules is between 10000 and 30000, the Shore hardness of the TPEE powder or granules is between 50 A and 100 A, and a melting point of the TPEE powder or granules with a temperature between 40° C. and 180° C.

Further, the first reaction solvent with 10 parts by weight, the modifier with 5 parts by weight, and the first initiator with 10 parts by weight.

Further, the second reaction solvent with 15 parts by weight, and the second initiator with 2.5 parts by weight.

Further, the first initiator and the first mixture are uniformly mixed as the second mixture at a rotation speed between 3 rpm and 7 rpm and at a temperature between 160° C. and 200° C.

Further, the rotation speed is 5 rpm, and the temperature is 180° C.

Further, the injection laminating process is to laminate the second mixture at a rate of 4-6 meters per minute to prepare the polyester elastomer membrane.

Further, the second mixture dried in environment with a temperature is 105° C.

A second purpose of the present disclosure is to provide a method of preparing self-adhesive polyester elastomer composite strip, which solves the technical problems of poor bonding strength and elastic recovery rate of prior art materials, and which combines with a self-adhesive pressure sensitive adhesive to achieve the second purpose of improving bonding strength and elastic recovery rate and being convenient to use.

In order to achieve the second purpose, the method of preparing self-adhesive polyester elastomer composite strip includes the following steps of: Preparing the self-adhesive polyester elastomer composite membrane above mentioned. Preparing a plurality of adhesive strips with a width from 0.6 cm to 2 cm through performing a cutting process to the self-adhesive polyester elastomer composite membrane.

When operating the method of preparing self-adhesive polyester elastomer composite membrane of the present disclosure, because the material of the polyester elastomer membrane and the material of the polyester fiber commonly used in textile products are approximately the same material. Therefore, when the polyester elastomer membrane is attached to clothing made by TPEE though the pressure sensitive adhesive, the materials are approximately the same, so there has high compatibility and high bonding strength after bonding both. Furthermore, the water pressure that can be withstood at bonding part can reach more than 10000mmH$_2$O. In addition, after the polyester elastomer membrane is modified with an amine of the modifier, the bonding strength and the elastic recovery rate of the material are significantly improved.

Therefore, the method of preparing self-adhesive polyester elastomer composite membrane solves the technical problems of poor bonding strength and elastic recovery rate of prior art materials, and which combines with a self-adhesive pressure sensitive adhesive to achieve the purpose of improving bonding strength and elastic recovery rate and being convenient to use.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

Figure 1:
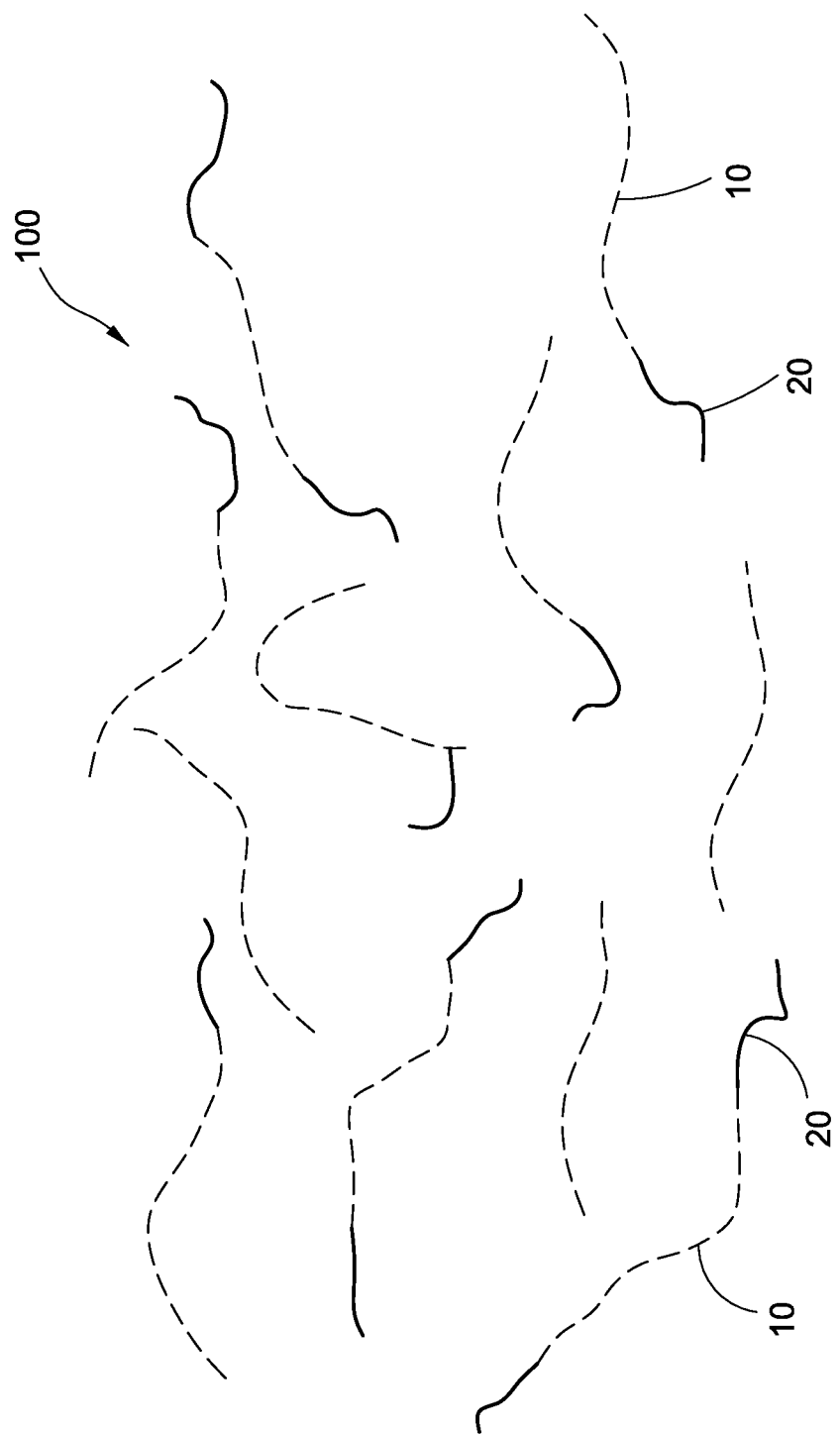
FIG. 1 is a schematic structural diagram of a polyester elastomer membrane.

The embodiments of the present disclosure are described by way of specific examples, and those skilled in the art can readily appreciate the other advantages and functions of the present disclosure. The present disclosure may be embodied or applied in various other specific embodiments, and various modifications and changes can be made without departing from the spirit and scope of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that can be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Figure 2:
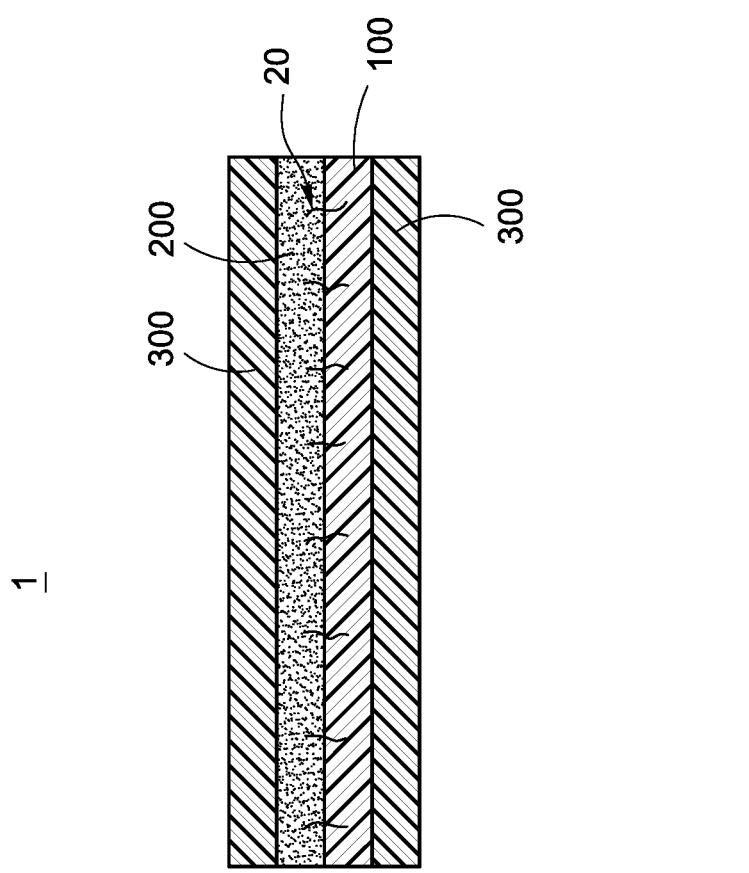
FIG. 2 is a schematic diagram of a method for preparing the self-adhesive polyester elastomer composite membrane.

Please refer to FIG. 1 and FIG. 2. FIG. 1 is a schematic structural diagram of a self-adhesive polyester elastomer composite membrane. FIG. 2 is a schematic diagram of a method for preparing the self-adhesive polyester elastomer composite membrane.

A method of preparing self-adhesive polyester elastomer composite membrane 1 of the present disclosure includes the following steps:

In first step, adding a first reaction solvent with 0.5-20 parts by weight to thermoplastic polyester elastomer (TPEE) powder or granules to prepare a solvent mixture, the first reaction solvent being methyl formate or ethyl acetate. The addition range of the first reaction solvent is between 0.5 and 20 parts by weight (relative to the TPEE powder or granules) to produce better solvent mixture, and the quality of the self-adhesive polyester elastomer composite membrane 1 produced by the solvent mixture is also better. When addition amount of the first reaction solvent is 10 parts by weight, the quality of the produced solvent mixture and the corresponding self-adhesive polyester elastomer composite membrane 1 produced is the best. In the embodiment of the present disclosure, a weight average molecular weight of the TPEE powder or granules is between 10000 and 30000, the Shore hardness of the TPEE powder or granules is between 50 A and 100 A, and a melting point of the TPEE powder or granules with a temperature between 40° C. and 180° C. The chemical structure of the TPEE powder or granules is as follows:

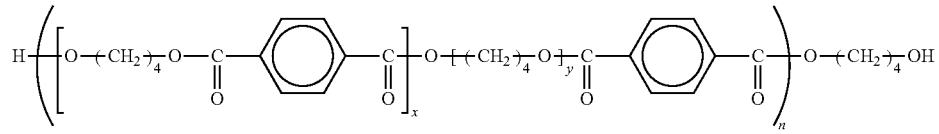

In second step, adding a modifier with 0.5-10 parts by weight to the solvent mixture, and mixing uniformly to prepare a first mixture, the modifier including at least one of o-xylylenediamine, m-xylylenediamine, alpha, alpha'-diamino-p-xylene, 2,3,5,6-Tetrachloro-p-xylene-alpha,alpha'-diamine, and 1,3,5,7-Tetraazatricyclodecane.

In second step above mentioned, the modifier can use o-xylylenediamine with the chemical structure is as follows:

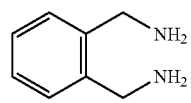

The chemical structure of m-xylylenediamine as follows:

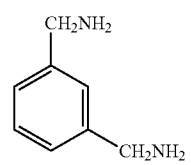

The chemical structure of alpha, alpha'-diamino-p-xylene as follows:

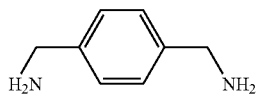

And the chemical structure of 1,3,5,7-Tetraazatricyclodecane as follows:

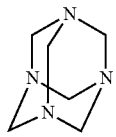

In alpha, alpha'-diamino-p-xylene, the other part of the benzene ring is connected to chlorine (that is, the position of the benzene ring 2, 3, 5, 6), so that it constitutes 2,3,5,6-Tetrachloro-p-xylene-alpha, alpha'-diamine which includes chlorine, and the chemical structure of the 2,3,5,6-Tetrachloro-p-xylene-alpha, alpha'-diamine as follows:

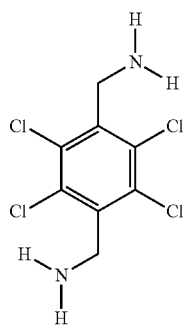 [SMILES: NCc1c(Cl)c(Cl)c(CN)c(Cl)c1Cl]

The modifier is a main raw material for grafting TPEE and modifying TPEE. The addition range of modifiers is between 0.5 and 10 parts by weight (relative to the TPEE powder or granules) to produce better first mixture, and the quality of the self-adhesive polyester elastomer composite membrane 1 produced by the first mixture is also better. Specifically, when addition amount of the modifier is insufficient (for example, less than 0.5 parts by weight), the range of chemical reaction is too small, resulting in the finished product as an unmodified TPEE film 100. Therefore, the bonding strength and elastic recovery rate of the finished product will be same as the unmodified TPEE film 100. However, when addition amount of modifier used is too much (for example, more than 10 parts by weight), the reaction is excessive, which causes the modifier to disintegrate the characteristics of the TPEE film 100. At this time, the finished product is relatively easy to break, and it will also make the finished product unable to smoothly fit on the textile material. Therefore, in order to improve the yield of the finished product during preparation, the addition range of the modifier is preferably between 0.5 and 10 parts by weight. When the addition amount of the modifier is 5 parts by weight, the quality of the first mixture and the self-adhesive polyester elastomer composite membrane 1 is the best.

In third step, adding a first initiator with 0.5-20 parts by weight to the first mixture, and mixing uniformly to prepare a second mixture, the first initiator including a photo initiator or a thermal initiator. The initiator may be potassium persulfate, azobisisobutyronitrile or benzildimethylketal is the preferred type of initiator. The addition range of the initiator ranges from 0.5-20 parts by weight (relative to the TPEE powder or granules) to produce a better second mixture. Specifically, a polymerization reaction of polymers does not occur for no reason, a mechanism that drives the polymerization reaction is often required. This mechanism requires energy such as light or heat to excite the monomer of the polymer to become an active center of chemical reaction, thereby starting the polymerization reaction. However, if the addition amount of the initiator is insufficient (for example, less than 0.5 parts by weight), the polymerization reaction is incomplete, so that the yield of the finished product decreases. If the addition amount of the initiator is too much (for example, more than 20 parts by weight), it will cause defects such as excessive chain ends of the molecular chains of the polymer, and also reduce the yield of the finished product. Therefore, the addition range of the initiator is preferably between 0.5 and 20 parts by weight. When the addition range of the initiator is 10 parts by weight, the quality of the second mixture and the self-adhesive polyester elastomer composite membrane 1 is the best.

In order to uniformly mix and fully react, an apparatus for mixing can be set under a mixing environment with a rotation speed of 3 rpm to 7 rpm, a temperature of 160° C. to 200° C., and the initiator and the first mixture are uniformly mixed as the second mixture. After the above-mentioned uniformly mixing, the modified molecular chain can fully react to graft one or both ends of the polyester polymer chain. When the rotation speed is set at 5 rpm and the temperature is set at 180° C., there has the best reaction efficiency.

In fourth step, drying the second mixture in environment with a temperature between 95° C. and 115° C., and preparing the polyester elastomer membrane 100 through an injection laminating process. The second mixture needs to be dried to reduce moisture content of the second mixture. It is beneficial to the quality of the polyester elastomer membrane 100 preparation during the injection laminating process. Specifically, when the moisture content of the second mixture is too much, the fluidity of injected material will be too high, and the thickness of a membrane produced is susceptible to fluidity and unevenness. If the moisture content is insufficient, the fluidity of the injected material will be insufficient, which will cause the injected material to not flow easily and easily produce blocky defective products. Therefore, the second mixture can control the moisture content at 500 ppm-1000 ppm as a better value. When the drying temperature is set under the environment of 105° C., the control of the moisture content of the second mixture and the drying rate are the best.

After the second mixture is dried to adjust to an appropriate moisture content, the dried second mixture is performed an injection laminating process on conveying substrate by an injection laminating equipment. The conveying substrate moves at a speed of 4-6 meters per minute to produce the polyester elastomer membrane 100 with better quality and thickness. Finally, the finished product of the injection laminating process can be cut into strips with appropriate width. Further, the width of the strips commonly used in this industry is preferably between 0.6 cm and 2 cm.

Please refer to FIG. 1. The FIG. 1 is a schematic structural diagram of a polyester elastomer membrane. The polyester elastomer membrane 100 with high conformability and high elasticity observed by scanning electron microscope (SEM) includes a plurality of polyester polymer chains 10 (indicated by broken lines) and a plurality of modified molecular chains 20 (indicated by solid lines). Each polyester polymer chain 10 includes two ends, and the polyester polymer chains 10 are stacked to constitute a main body of the polyester elastomer membrane 100. The modified molecular chain 20 is grafted to one or both ends of the polyester polymer chain 10 respectively, and since the ratio of the modifier is less than the TPEE powder or granules, not every polyester polymer chain 10 is grafted to at least one modified molecular chain 20. If the weight part of the modified molecular chain 20 is higher, the number of modified molecular chains 20 will increase, and the proportion of the modified molecular chain 20 grafted to the polyester polymer chain 10 will be higher. The modified molecular chain 20 enhances the elasticity of the polyester elastomer membrane 100, and enhances the bonding strength when bonding with textiles and other materials, so that the polyester elastomer membrane 100 can hold the textiles and other materials more firmly without falling off, and not easy to be deformed by external force.

The main purpose and effect of the present disclosure is that, because the material of the polyester elastomer membrane 100 and the material of the polyester fiber commonly used in textile products are approximately the same material. Therefore, when the polyester elastomer membrane is attached to clothing made by TPEE though a pressure sensitive adhesive 200, the materials are approximately the same, so there has high compatibility and high bonding strength after bonding both. Furthermore, the water pressure that can be withstood at bonding part can reach more than 10000mmH$_2$O. In addition, since most of the materials attached to textiles are made of thermosetting polyurethane (PU) or thermoplastic polyurethanes (TPU), they cannot be melted together with textiles because of incompatibility with textile materials (when the thermosetting polyurethane or the thermoplastic polyurethane elastomer melts, residues are generated). Since the polyester elastomer membrane 100 with high bonding strength of the present disclosure has material characteristics similar to those of textile materials, the clothes made therefrom can be directly melted and recovered together, so the effect of high recycling compatibility can be achieved. Furthermore, the secondary purpose and efficacy of the present disclosure is that, since today's society is more and more concerned about the non-toxic living environment, the polyester elastomer membrane 100 produced of the disclosure does not add the highly toxic substances related to di-isocyanate. Therefore, the polyester elastomer membrane 100 can be used to make textiles with non-toxic materials.

In fifth step, mixing butylacrylate with 10-30 parts by weight, methylacrylate with 10-30 parts by weight, and acrylic acid with 10-30 parts by weight uniformly to prepare a third mixture.

In sixth step, adding a second reaction solvent with 10-30 parts by weight to the third mixture, and mixing uniformly to prepare a fourth mixture, the second reaction solvent being methyl formate or ethyl acetate. In the present disclosure, the second reaction solvent with 15 parts by weight.

In seventh step, adding diaminodiphenylmethane with 0.5-5 parts by weight, phthalic acid anhydride parts by weight, and powder of triacryloylhexahydro-1,3,5-triazine 0.5-5 parts by weight to the fourth mixture, and mixing uniformly to prepare a fifth mixture.

In eighth step, adding a second initiator with 0.5-5 parts by weight to the fifth mixture, and mixing uniformly to prepare a sixth mixture, the second initiator including a photo initiator or a thermal initiator. The initiator may be a photo initiator or a thermal initiator, and may be potassium persulfate, azobisisobutyronitrile or benzildimethylketal is the preferred type of initiator. The addition range of the initiator ranges from 2.5 parts by weight (relative to the TPEE powder or granules) to produce a better fifth mixture and a better pressure sensitive adhesive 200.

In ninth step, placing the sixth mixture in environment with 100% nitrogen and a temperature between 60° C. and 90° C. for a polymerization reaction in two hours to prepare the pressure sensitive adhesive 200.

In tenth step, pasting the pressure sensitive adhesive 200 on one side of the polyester elastomer membrane 100, and placing in environment with a temperature between 60° C. and 90° C. to prepare the self-adhesive polyester elastomer composite membrane 1. In the embodiment of the present disclosure, the pressure sensitive adhesive 200 and the polyester elastomer membrane 100 may be coated with a release paper layer 300 respectively to protect the pressure sensitive adhesive 200 and the polyester elastomer membrane 100 when not in use. Please refer to FIG. 2.

Figure 3:
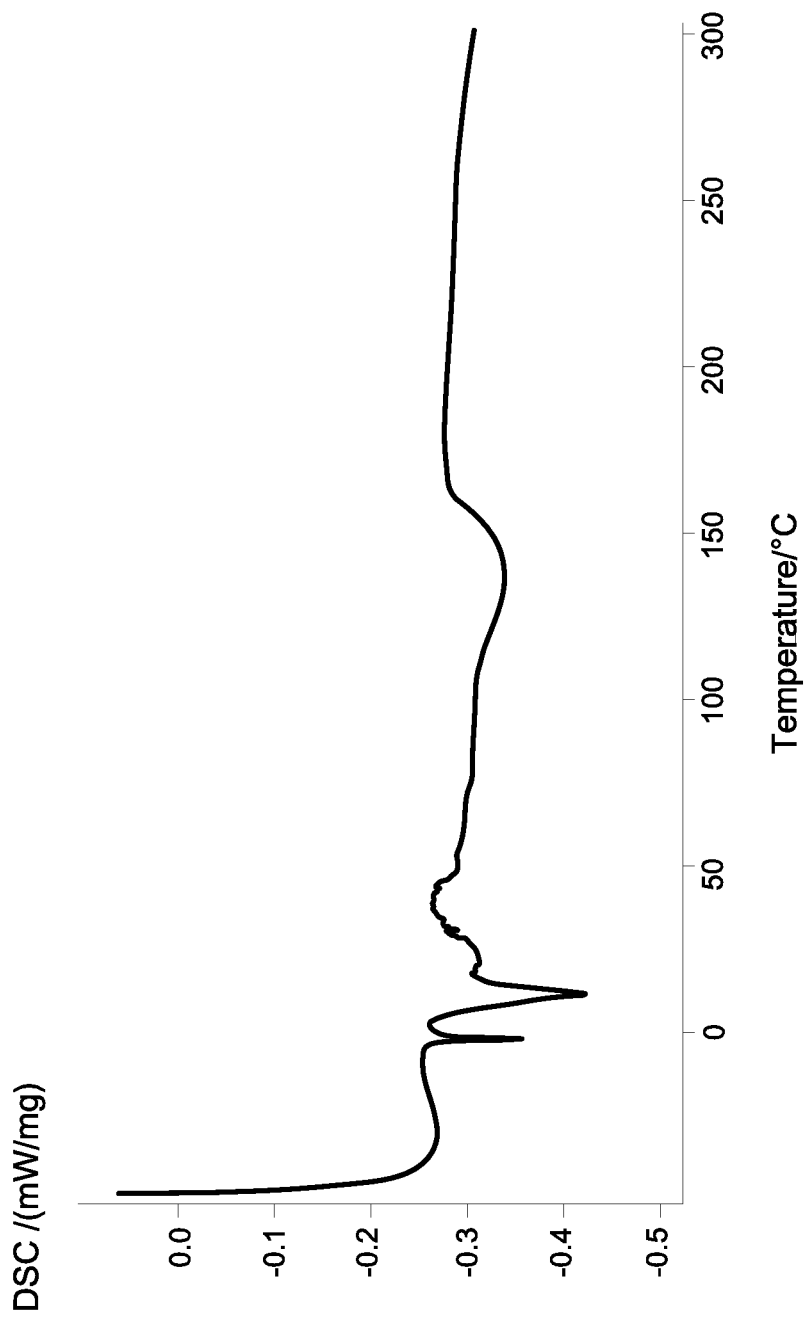
FIG. 3 is an analysis results diagram of the self-adhesive polyester elastomer composite membrane made by differential scanning calorimetry.

Please refer to FIG. 3. FIG. 3 is an analysis results diagram of the self-adhesive polyester elastomer composite membrane made by differential scanning calorimetry. The differential scanning calorimetry (DSC) is a thermal analysis technique, which uses a compensator to measure the relationship between the heating rate and the temperature (° C.) required to bring the sample and the reference substance to the same temperature. The unit of value can be mW/mg.

Example 1

Adding ethyl acetate with 10 parts by weight to the TPEE powder or granules to prepare a solvent mixture, adding 2,3,5,6-Tetrachloro-p-xylene-alpha, alpha'-diamine with 5 parts by weight to the solvent mixture, and mixing uniformly to prepare a first mixture. And then, adding potassium sulfate with 10 parts by weight to the first mixture, and mixing uniformly in environment with a rotation speed of 5 rpm and a temperature of 180° C. to prepare a second mixture. Finally, it is dried in environment with a temperature of 105° C., and a speed of 5 meters per minute of injection laminating process is performed to complete the preparation of the finished product of the polyester elastomer membrane 100. And then, combining polyester elastomer membrane 100 and pressure sensitive adhesive 200 to prepare the self-adhesive polyester elastomer composite membrane 1. The finished product is analyzed by differential scanning calorimetry (DSC) as shown in FIG. 3. The test condition is 7 mg in weight, the temperature is between 25° C. and 350° C., and rise rate of the temperature is 10° C. per minute, it can be seen that the melting temperature of the finished product is about 130° C. The finished product was tested using the elastic recovery rate test of EN14704-1 and the peeling strength test of ISO 2411. The test conditions were 6×2 inch for the clamps, the distance between the upper clamp and lower clamp is 5 cm, the constant rate of extension (CRE) was 100 mm per minute, and use constant speed stretching to separate the self-adhesive polyester elastomer composite membrane 1 from the attached substrate (base fabric) and detect the "peeling strength (kgf/cm)". The obtained parameters are shown in Table 1 below.

Example 2

Adding methyl formate with 20 parts by weight to the TPEE powder or granules to prepare a solvent mixture, adding m-xylylenediamine with 10 parts by weight to the solvent mixture, and mixing uniformly to prepare a first mixture. And then, adding azobisisobutyronitrile with 20 parts by weight to the first mixture, and mixing uniformly in environment with a rotation speed of 7 rpm and a temperature of 200° C. to prepare a second mixture. Finally, it is dried in environment with a temperature of 115° C., and a speed of 6 meters per minute of injection laminating process is performed to complete the preparation of the finished product of the polyester elastomer membrane 100. And then, combining polyester elastomer membrane 100 and pressure sensitive adhesive 200 to prepare the self-adhesive polyester elastomer composite membrane 1. The finished product is the same as the above test method, and the test results and parameters are shown in Table 1 below.

Example 3

Adding ethyl acetate with 0.5 parts by weight to the TPEE powder or granules to prepare a solvent mixture, adding o-xylylenediamine with 0.5 parts by weight to the solvent mixture, and mixing uniformly to prepare a first mixture. And then, adding azobisisobutyronitrile with 0.5 parts by weight to the first mixture, and mixing uniformly in environment with a rotation speed of 3 rpm and a temperature of 150° C. to prepare a second mixture. Finally, it is dried in environment with a temperature of 95° C., and a speed of 4 meters per minute of injection laminating process is performed to complete the preparation of the polyester elastomer membrane 100. And then, combining polyester elastomer membrane 100 and pressure sensitive adhesive 200 to prepare the self-adhesive polyester elastomer composite membrane 1. The finished product is the same as the above test method, and the test results and parameters are shown in Table 1 below.

Example 4

Adding methyl formate with 5 parts by weight to the TPEE powder or granules to prepare a solvent mixture, adding alpha, alpha'-diamino-p-xylene with 7.5 parts by weight to the solvent mixture, and mixing uniformly to prepare a first mixture. And then, adding benzildimethylketal with 5 parts by weight to the first mixture, and mixing uniformly in environment with a rotation speed of 4 rpm and a temperature of 190° C. to prepare a second mixture. Finally, it is dried in environment with a temperature of 110° C., and a speed of 5 meters per minute of injection laminating process is performed to complete the preparation of the finished product of the polyester elastomer membrane 100. And then, combining polyester elastomer membrane 100 and pressure sensitive adhesive 200 to prepare the self-adhesive polyester elastomer composite membrane 1. The finished product is the same as the above test method, and the test results and parameters are shown in Table 1 below.

Example 5

Adding ethyl acetate with 15 parts by weight to the TPEE powder or granules to prepare a solvent mixture, adding 1,3,5,7-Tetraazatricyclodecane with 2.5 parts by weight to the solvent mixture, and mixing uniformly to prepare a first mixture. And then, adding potassium persulfate with 15 parts by weight to the first mixture, and mixing uniformly in environment with a rotation speed of 6 rpm and a temperature of 170° C. to prepare a second mixture. Finally, it is dried in environment with a temperature of 100° C., and a speed of 6 meters per minute of injection laminating process is performed to complete the preparation of the finished product of the polyester elastomer membrane 100. And then, combining polyester elastomer membrane 100 and pressure sensitive adhesive 200 to prepare the self-adhesive polyester elastomer composite membrane 1. The finished product is the same as the above test method, and the test results and parameters are shown in Table 1 below.

Example 6

Adding methyl formate with 10 parts by weight to the TPEE powder or granules to prepare a solvent mixture, adding a modifier with 5 parts by weight to the solvent mixture, and mixing uniformly to prepare a first mixture. The modifier is prepared by adjusting the ratio of o-xylylenediamine, m-xylylenediamine, alpha, alpha'-diamino-p-xylene, and 1,3,5,7-Tetraazatricyclodecane to 25%: 25%: 25%: 25%. And then, adding azobisisobutyronitrile with 10 parts by weight to the first mixture, and mixing uniformly in environment with a rotation speed of 5 rpm and a temperature of 180° C. to prepare a second mixture. Finally, it is dried in environment with a temperature of 105° C., and a speed of 4 meters per minute of injection laminating process is performed to complete the preparation of the finished product of the polyester elastomer membrane 100. And then, combining polyester elastomer membrane 100 and pressure sensitive adhesive 200 to prepare the self-adhesive polyester elastomer composite membrane 1. The finished product is the same as the above test method, and the test results and parameters are shown in Table 1 below.

Comparative Example

The TPEE powder or granules are directly prepared as a polyester elastomer composite membrane. The finished product is the same as the above test method, and the test results and parameters are shown in Table 1 below.

TABLE 1 test parameters of examples and a comparative example

| | Comparative Example | Example 1 | Example 2 | Example 3 | Example 4 | Example 5 | Example 6 |
|---|---|---|---|---|---|---|---|
| Melt Flow Index (M.I.) | 4.8 | 30.5 | 32.5 | 32.4 | 33.2 | 30.8 | 32.4 |
| TFB (° C.) | 205.8 | 138.9 | 130.8 | 138.2 | 139.5 | 140.2 | 143.0 |
| DSC (° C.) | 144.9 | 135.8 | 124 | 126.6 | 125.7 | 132.2 | 130.9 |
| Peeling strength 175° C./25 s (0.15 mm) (kgf/cm) | 0 | 2.9 | 3.1 | 2.8 | 3.7 | 3.4 | 2.8 |

TABLE 1-continued test parameters of examples and a comparative example

|  | Comparative Example | Example 1 | Example 2 | Example 3 | Example 4 | Example 5 | Example 6 |
|---|---|---|---|---|---|---|---|
| Peeling strength 165° C./25 s (0.15 mm) (kgf/cm) | 0 | 1.8 | 2.2 | 2.8 | 2.7 | 2.2 | 2.7 |
| Peeling strength 135° C./25 s (Double sided heating) (0.15 mm) (kgf/cm) | 0 | 1.6 | 1.8 | 2.0 | 1.7 | 1.7 | 1.7 |
| self-adhesive force @ 25° C. (gf/cm) | 0 | 120 | 125 | 127 | 130 | 128 | 130 |
| elastic recovery rate test of EN14704-1 (%) | 70 (180° C.) | 83 (160° C.) | 95 (160° C.) | 92 (160° C.) | 89 (160° C.) | 86 (160° C.) | 86 (160° C.) |

The above table clearly shows that whether the modifier is a single compound or a mixed compound, all kind of the finished product have better peeling strength and better elastic recovery rate. The modifier uses chlorine-containing 2,3,5,6-Tetrachloro-p-xylene-alpha, alpha'-diamine, although the peeling strength and elastic recovery rate are poor, but the self-adhesive polyester elastomer membrane 1 has better flexibility. The polyester elastomer composite membrane of the comparative example 1 has a peeling strength of 0, cannot be bonded to textile materials, and the elastic recovery rate is not enough. The product of the comparative example cannot be restored to its original shape after being deformed.

When operating the method of preparing self-adhesive polyester elastomer composite membrane 1 of the present disclosure, because the material of the polyester elastomer membrane 100 and the material of the polyester fiber commonly used in textile products are approximately the same material. Therefore, when the polyester elastomer membrane 100 is attached to clothing made by TPEE though the pressure sensitive adhesive 200, the materials are approximately the same, so there has high compatibility and high bonding strength after bonding both. Furthermore, the water pressure that can be withstood at bonding part can reach more than 10000mmH$_2$O. In addition, after polyester elastomer membrane 100 is modified with an amine of the modifier, the bonding strength and the elastic recovery rate of the material are significantly improved.

Therefore, the method of preparing self-adhesive polyester elastomer composite membrane 1 solves the technical problems of poor bonding strength and elastic recovery rate of prior art materials, and which combines with a self-adhesive pressure sensitive adhesive 200 to achieve the purpose of improving bonding strength and elastic recovery rate and being convenient to use.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

What is claimed is:

1. A method of preparing self-adhesive polyester elastomer composite membrane, comprising the following steps of:

adding a first reaction solvent in the amounts of from 0.5 to 20 parts by weight to thermoplastic polyester elastomer (TPEE) powder or granules to prepare a solvent mixture, the first reaction solvent being methyl formate or ethyl acetate, adding a modifier in the amounts of from 0.5 to 10 parts by weight to the solvent mixture, and mixing uniformly to prepare a first mixture, the modifier including at least one of o-xylylenediamine; m-xylylenediamine; alpha, alpha'-diamino-p-xylene; 2,3,5,6-Tetrachloro-p-xylene-alpha,alpha'-diamine; and 1,3,5,7-Tetraazatricyclodecane, adding a first initiator in the amounts of from 0.5 to 20 parts by weight to the first mixture, and mixing uniformly to prepare a second mixture, the first initiator including a photo initiator or a thermal initiator, drying the second mixture in environment with a temperature between 95° C. and 115° C., and preparing a polyester elastomer membrane through an injection laminating process to laminate the second mixture on a conveying substrate, mixing butylacrylate in the amounts of from 0.5 to 30 parts by weight, methylacrylate in the amounts of from 0.5 to 30 parts by weight, and acrylic acid in the amounts of from 0.5 to 30 parts by weight uniformly to prepare a third mixture, adding a second reaction solvent in the amounts of from 0.5 to 30 parts by weight to the third mixture, and mixing uniformly to prepare a fourth mixture, the second reaction solvent being methyl formate or ethyl acetate, adding diaminodiphenylmethane in the amounts of from 0.5 to 5 parts by weight, phthalic acid anhydride in the amounts of from 0.5 to 5 parts by weight, and powder of triacryloylhexahydro-1,3,5-triazine in the amounts of from 0.5 to 5 parts by weight to the fourth mixture, and mixing uniformly to prepare a fifth mixture, adding a second initiator in the amounts of from 0.5 to 5 parts by weight to the fifth mixture, and mixing uniformly to prepare a sixth mixture, the second initiator including a photo initiator or a thermal initiator, placing the sixth mixture in environment with 100% nitrogen and a temperature between 60° C. and 90° C. for a polymerization reaction in two hours to prepare a pressure sensitive adhesive, and pasting the pressure sensitive adhesive on one side of the polyester elastomer membrane, and placing the pressure sensitive adhesive and the polyester elastomer membrane in environment with a temperature between 60° C. and 90° C. to prepare a self-adhesive polyester elastomer composite membrane comprising the pressure sensitive adhesive and the polyester elastomer membrane.

2. The method of preparing self-adhesive polyester elastomer composite membrane of claim 1, wherein a weight average molecular weight of the TPEE powder or granules is between 10000 and 30000, the Shore hardness of the TPEE powder or granules is between 50A and 100A, and a melting point of the TPEE powder or granules is a temperature between 40° C. and 180° C.

3. The method of preparing self-adhesive polyester elastomer composite membrane of claim 1, wherein the first reaction solvent 10 parts by weight, the modifier 5 parts by weight, and the first initiator 10 parts by weight.

4. The method of preparing self-adhesive polyester elastomer composite membrane of claim 1, wherein the second reaction solvent 15 parts by weight, and the second initiator 2.5 parts by weight.

5. The method of preparing self-adhesive polyester elastomer composite membrane of claim 1, wherein the first initiator and the first mixture are uniformly mixed as the second mixture at a rotation speed between 3 rpm and 7 rpm and at a temperature between 160° C. and 200° C.

6. The method of preparing self-adhesive polyester elastomer composite membrane of claim 5, wherein the rotation speed is 5 rpm, and the temperature is 180° C.

7. The method of preparing self-adhesive polyester elastomer composite membrane of claim 1, wherein the injection laminating process is to laminate the second mixture at a rate of 4-6 meters per minute to prepare the polyester elastomer composite membrane.

8. The method of preparing self-adhesive polyester elastomer composite membrane of claim 1, wherein the second mixture is dried in environment with a temperature of 105° C.

9. A method of preparing self-adhesive polyester elastomer composite strip comprising the following steps:

preparing the self-adhesive polyester elastomer composite membrane in claim 1, and preparing a plurality of adhesive strips has a width from 0.6 cm to 2 cm through performing a cutting process to the self-adhesive polyester elastomer composite membrane.

* * * * *